United States Patent
Batcho, Sr. et al.

(10) Patent No.: US 9,183,423 B2
(45) Date of Patent: Nov. 10, 2015

(54) DRIVE-OVER STAND AND ANTENNA ASSEMBLY

(71) Applicant: The Goodyear Tire & Rubber Company, Akron, OH (US)

(72) Inventors: Joseph Paul Batcho, Sr., Warren, OH (US); John Michael Fenkanyn, Akron, OH (US); Amrita Patel, Copley, OH (US); Mario Vincent Orosa, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 168 days.

(21) Appl. No.: 13/951,737

(22) Filed: Jul. 26, 2013

(65) Prior Publication Data

US 2015/0028101 A1 Jan. 29, 2015

(51) Int. Cl.
*G06K 7/10* (2006.01)
*H01Q 1/22* (2006.01)

(52) U.S. Cl.
CPC .......... *G06K 7/10316* (2013.01); *H01Q 1/2208* (2013.01); *H01Q 1/2241* (2013.01)

(58) Field of Classification Search
CPC ............ B60C 23/0408; B60C 23/0427; B60C 23/0433; B60C 23/0435; B60C 23/0437; B60C 23/0438; B60C 23/0442; B60C 23/0444; B60C 23/0447; B60C 23/0449; B60C 23/0452; B60C 23/0461; B60C 23/0479; H01Q 1/2208; H01Q 1/2216; H01Q 1/2241; G06K 7/10316; G06K 7/10346; G06K 7/10356; G06K 7/10475; G06K 7/10089; G06K 7/10366; G06K 7/10425; B66F 7/243; B60T 3/00; G08G 1/02; G08G 1/042; E01F 11/00
USPC .......... 235/439, 451; 340/572.1, 572.4, 572.7, 340/572.8, 539.1, 10.1, 10.3, 933, 936, 941, 340/947, 446–448; 73/146; 188/32; 410/30; 211/20, 22–24; 254/88; 248/352; 14/69.5
See application file for complete search history.

(56) References Cited

U.S. PATENT DOCUMENTS

| | | | |
|---|---|---|---|
| 4,067,235 A | 1/1978 | Markland et al. | 73/146.5 |
| 4,819,910 A * | 4/1989 | Johnston | 254/88 |
| 5,192,954 A | 3/1993 | Brockelsby et al. | 342/42 |
| 5,445,020 A | 8/1995 | Rosensweig | 73/146.2 |
| 5,522,144 A | 6/1996 | Smoorenburg | 33/203.14 |
| 5,753,810 A | 5/1998 | Bass | 73/146.3 |

(Continued)

FOREIGN PATENT DOCUMENTS

| | | | |
|---|---|---|---|
| DE | 2610621 | 9/1997 | G01L 9/10 |
| EP | 2085254 | 8/2009 | B60C 23/04 |

(Continued)

OTHER PUBLICATIONS

European Search Report.

*Primary Examiner* — Michael G Lee
*Assistant Examiner* — Suezu Ellis
(74) *Attorney, Agent, or Firm* — Richardson B. O'Planick

(57) ABSTRACT

A drive over stand for a TAG reader has a lead-on ramped surface and an exit-off ramped surface aligned and operative to intercept and engage the vehicle tire as the vehicle tire traverses over the upper surface of the stand. One or more pockets are disposed within the stand base, each receiving an antenna assembly. The antenna assembly is positioned within the pocket of the base, seated at a tilt angle operative to direct a read field toward a vehicle approach path to the stand.

14 Claims, 20 Drawing Sheets

(56) References Cited

U.S. PATENT DOCUMENTS

| | | | |
|---|---|---|---|
| 5,942,681 A | 8/1999 | Vollenweider et al. | 73/146.2 |
| 6,520,344 B2* | 2/2003 | Graham | 211/20 |
| 6,937,144 B2 | 8/2005 | Drake et al. | 340/447 |
| 7,196,637 B2 | 3/2007 | Sabet et al. | 340/933 |
| 7,969,293 B2 | 6/2011 | Benedict et al. | 340/442 |
| 2002/0140574 A1* | 10/2002 | Starkey et al. | 340/870.16 |
| 2004/0056764 A1* | 3/2004 | Kusunoki et al. | 340/442 |
| 2007/0018805 A1 | 1/2007 | Dixon et al. | |
| 2010/0238290 A1* | 9/2010 | Riley et al. | 348/148 |
| 2011/0148592 A1* | 6/2011 | Benedict et al. | 340/10.3 |
| 2011/0148593 A1* | 6/2011 | Benedict et al. | 340/10.3 |

FOREIGN PATENT DOCUMENTS

| | | | |
|---|---|---|---|
| EP | 2202099 | 6/2010 | |
| EP | 2339692 | 6/2011 | |
| WO | 2005036694 | 4/2005 | |
| WO | 2005/072993 | 8/2005 | B60C 23/04 |

\* cited by examiner

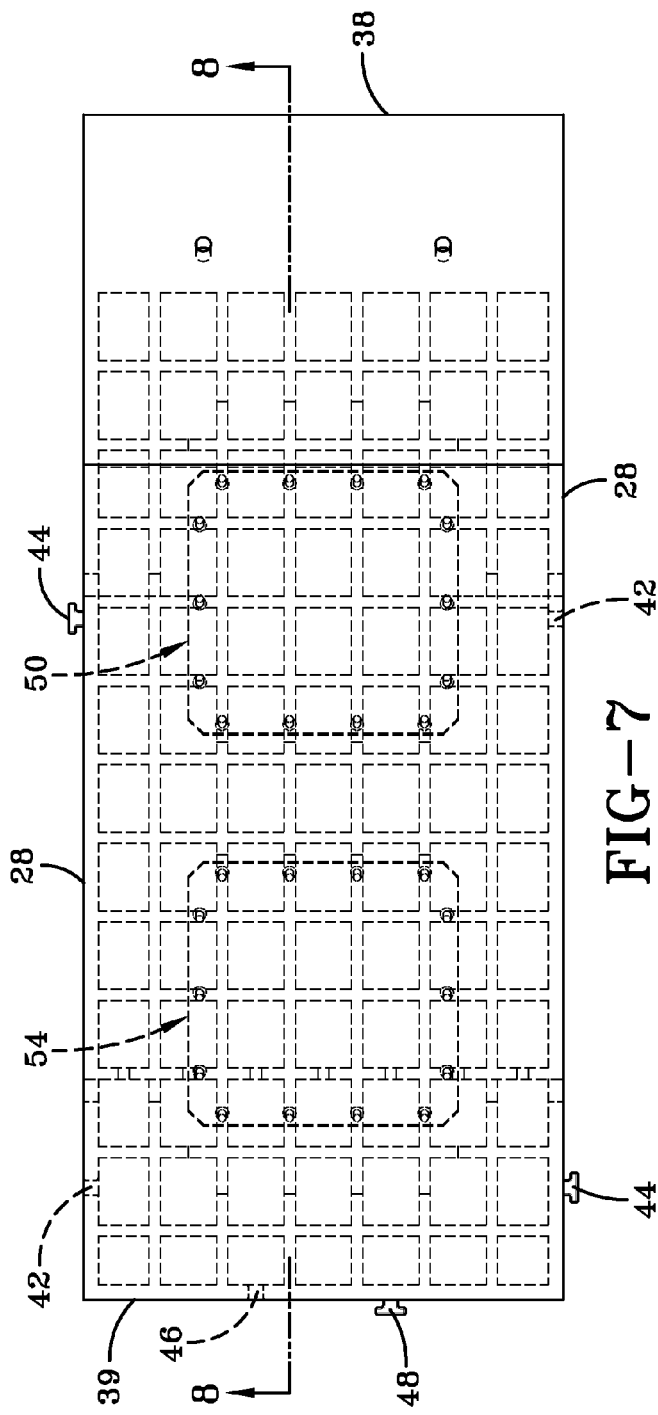
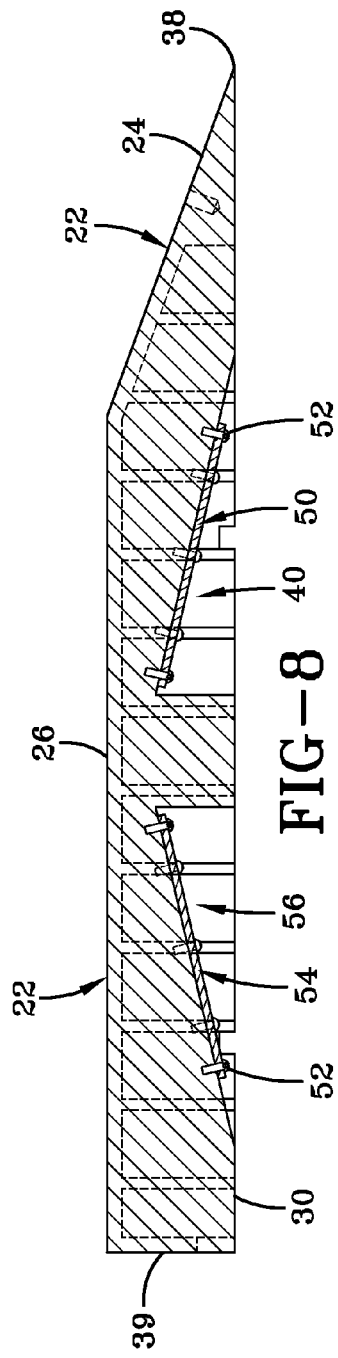

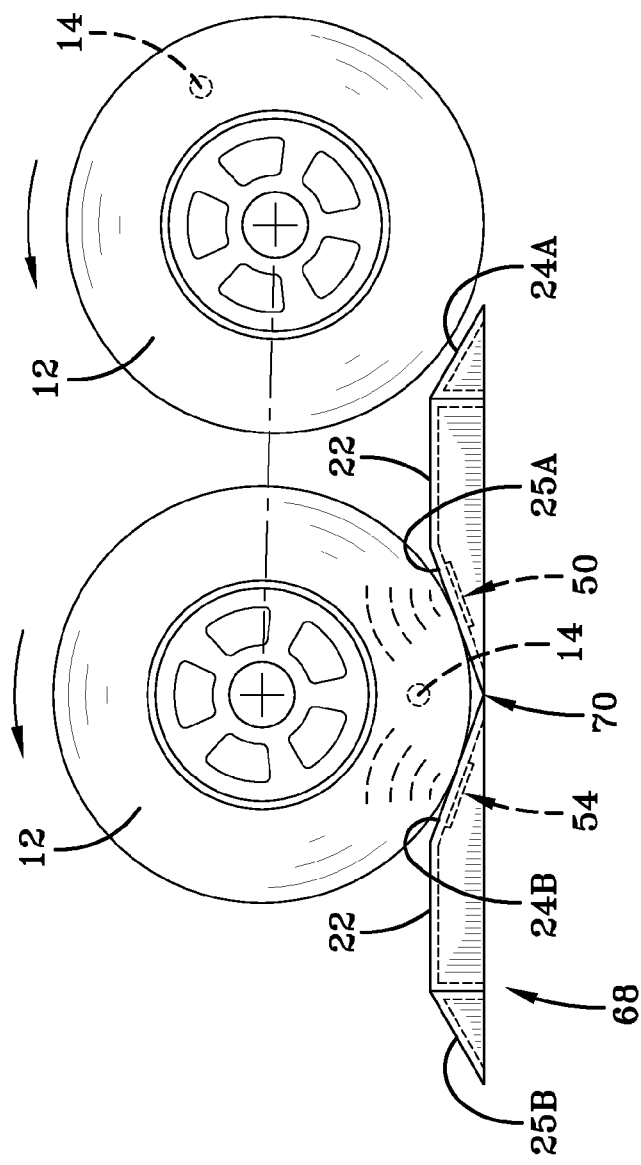
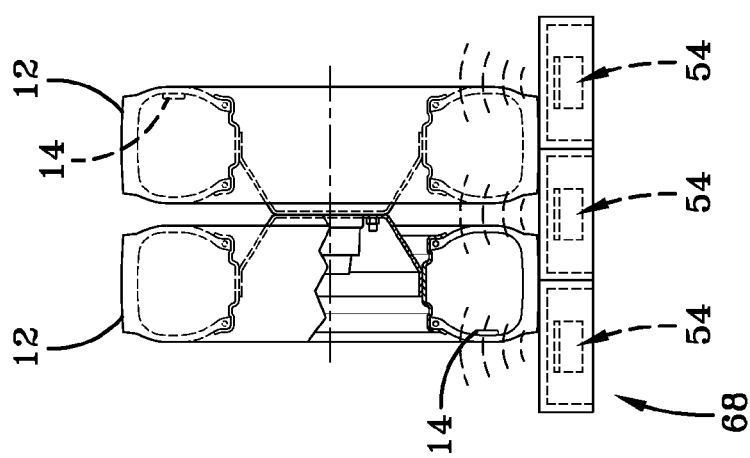

DRIVE-OVER STAND AND ANTENNA ASSEMBLY

FIELD OF THE INVENTION

The invention relates generally to RFID device readers and, more specifically, to an antenna assembly for a reader of RFID devices mounted to the wheel units of a vehicle.

BACKGROUND OF THE INVENTION

Radio frequency identification devices (RFID devices) are useful in association with sundry product categories and have gained widespread commercial importance and acceptance. Such devices generally have memory storage capability for electronically storing product-specific information such as product history and a product identification number. The device further provides an integrated transmitter that transmits responsive to a prompt signal the stored data for receipt by a receiver antenna. For example, it is known to associate an RFID with a vehicle tire or wheel rim assembly in order to access tire, vehicle, and/or wheel related identification and history throughout the lifetime service of the product.

It is important in any RFID transmission system that the data transmitted by the product-based RFID device be transmitted reliably, expeditiously, and without error to a reader for processing and use. Without a reliable data transmission and reception capability, the integrity of the information downloaded and the utility of the system will be compromised. In a vehicle tire or wheel-based application, the construction of a reliable RFID data transmission system presents numerous application-specific challenges that must be addressed in order to achieve an acceptable level of performance.

SUMMARY OF THE INVENTION

According to a first aspect of the invention, a stand and antenna assembly is provided, the stand having a lead-on ramped surface and an exit-off ramped surface aligned and operative to intercept and engage the vehicle tire as the vehicle tire traverses over the upper surface of the stand. A pocket is disposed within the stand base configured for receiving an antenna assembly. An antenna assembly is positioned within the pocket of the base, seated at a tilt angle operative to direct a read field toward a vehicle approach path to the stand. Pursuant to another aspect, the antenna assembly is constructed as a planar panel body, a plane of the planar panel body tilting at the tilt angle toward the vehicle approach path.

In a further aspect, the stand is constructed having two pockets formed within the base, with two antenna assemblies seated respectively within the pockets at a respective tilt angle. The first antenna assembly directs a read field toward a vehicle approach path to the stand and the second antenna assembly directs a second read field toward a vehicle exit path from the stand. One or more additional antenna assemblies may be mounted within the base of the stand, adapted to receive antenna assembly(s) and to direct a read field to other regions of the stand upper surface such as an intermediate region between the lead-on and the exit-off ramps. A V-shaped channel may be formed to extend transversely across the stand, with one or more antenna assembly(s) seated within a pocket to direct a read field toward one or both of the converging ramped surfaces forming the V-shaped channel.

According to another aspect, the stand may be assembled from a modular array of stand components mutually connected together by keying and interlocking protrusions.

BRIEF DESCRIPTION OF THE DRAWINGS

The invention will be described by way of example and with reference to the accompanying drawings in which:

FIG. 7 is a top view of the stand showing antenna locations in phantom.
FIG. 8 is a section view taken along 8-8 of FIG. 7.
FIGS. 15B and C are end and side views showing inverted ramp alternative embodiment in use.

DETAILED DESCRIPTION OF THE INVENTION

Figure 1:
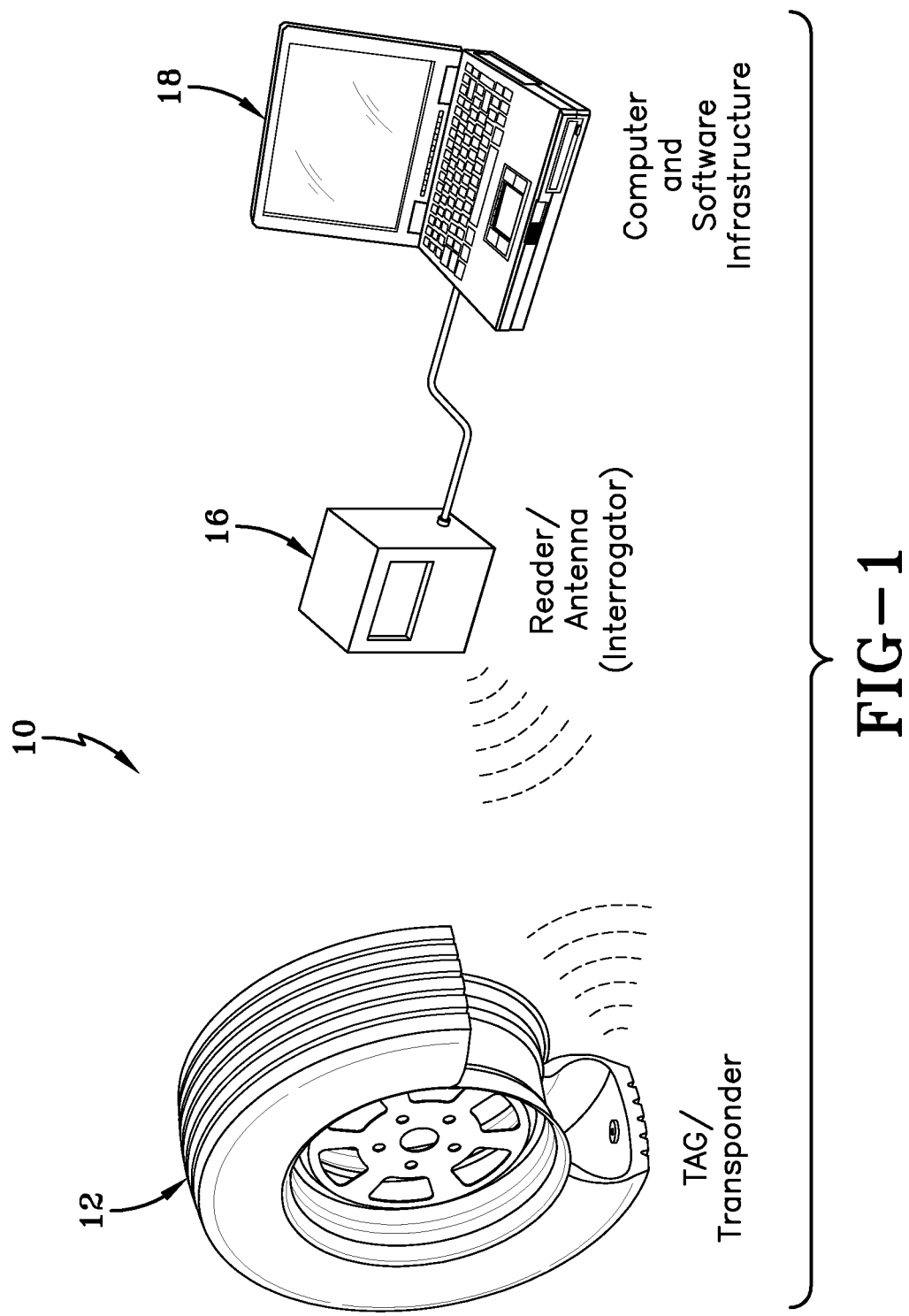
FIG. 1 is a diagram view of tire mounted RFID system.
Figure 2:
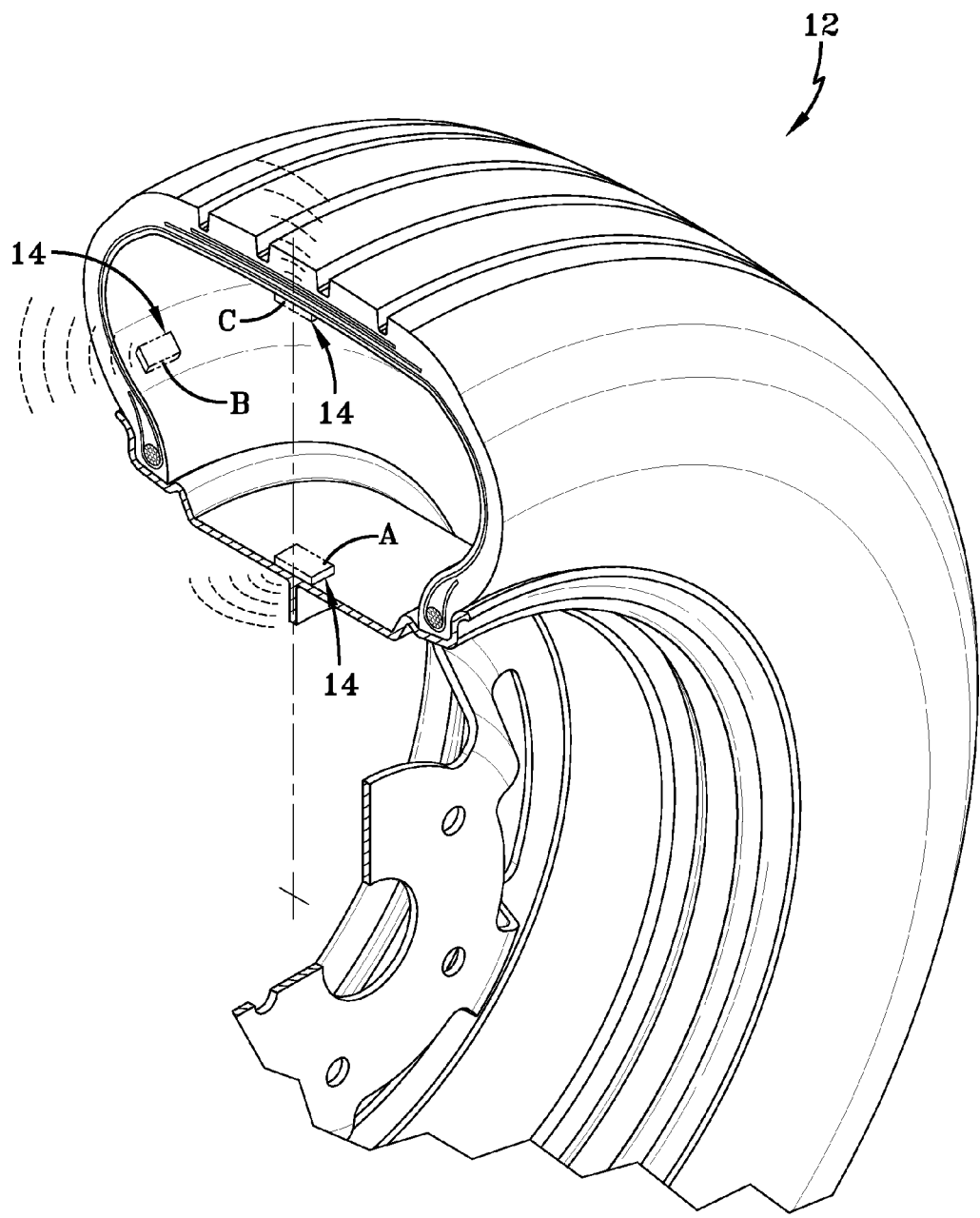
FIG. 2 is a partial section view of tire and rim showing different RFID tag locations.

Referring first to FIGS. 1 and 2, a tire-based RFID system 10 is shown in which a tire 12 is provided with a tag or transponder 14. The transponder 14 functionally operates to transmit by radio frequency tire identification information to a remote reader or antenna 16 interrogator. The interrogator 16 provides the information to a computer and software infrastructure 18 which can thereby track the tire, its usage, and history throughout the useful life of the tire. The transponder 14 may be affixed at any suitable location and manner to the tire as shown in FIG. 2, such as on the tire rim (position A); the tire inner sidewall surface (position B); or the tire inner tread region surface (position C). The transponder 14 may further have additional sensors incorporated therein such as temperature or pressure monitoring sensors. Data from such sensors may likewise be transmitted to the remote reader 16 and used to monitor the status of tire 12.

Figure 3:
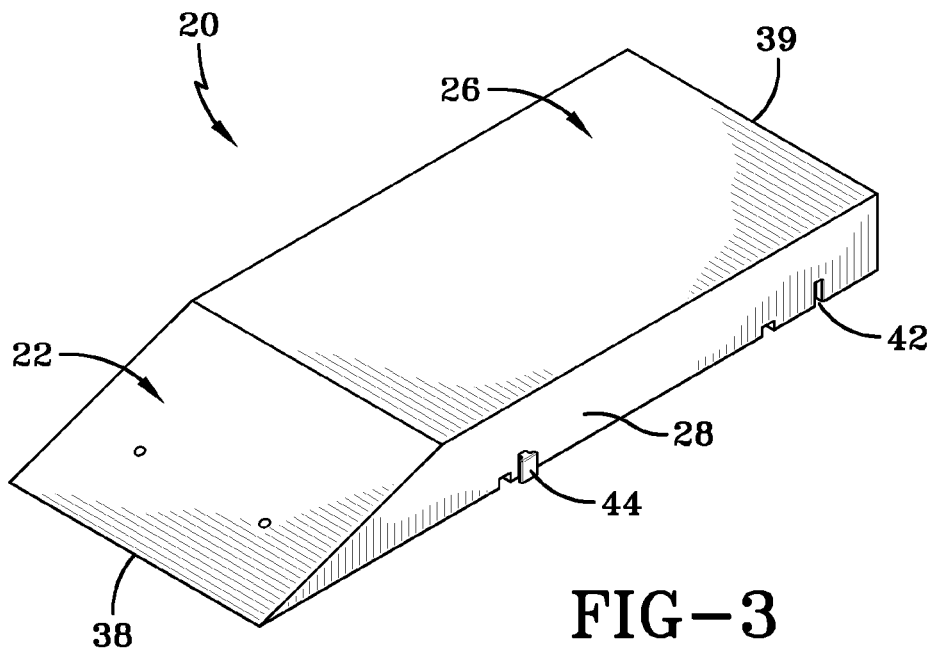
FIG. 3 is a top perspective view of a stand component.
Figure 4:
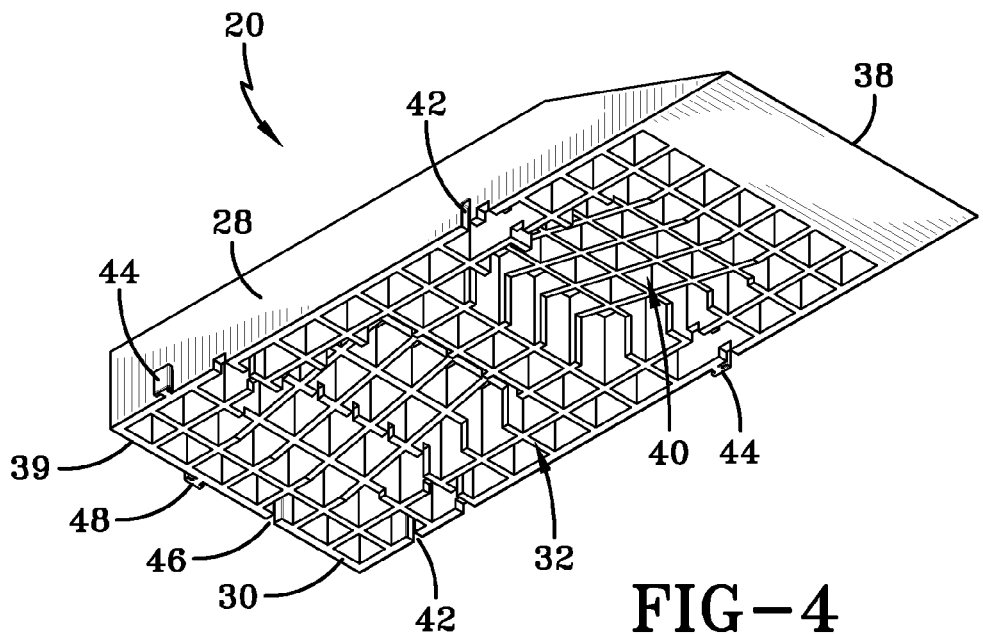
FIG. 4 is a bottom view of FIG. 3.
Figure 5:
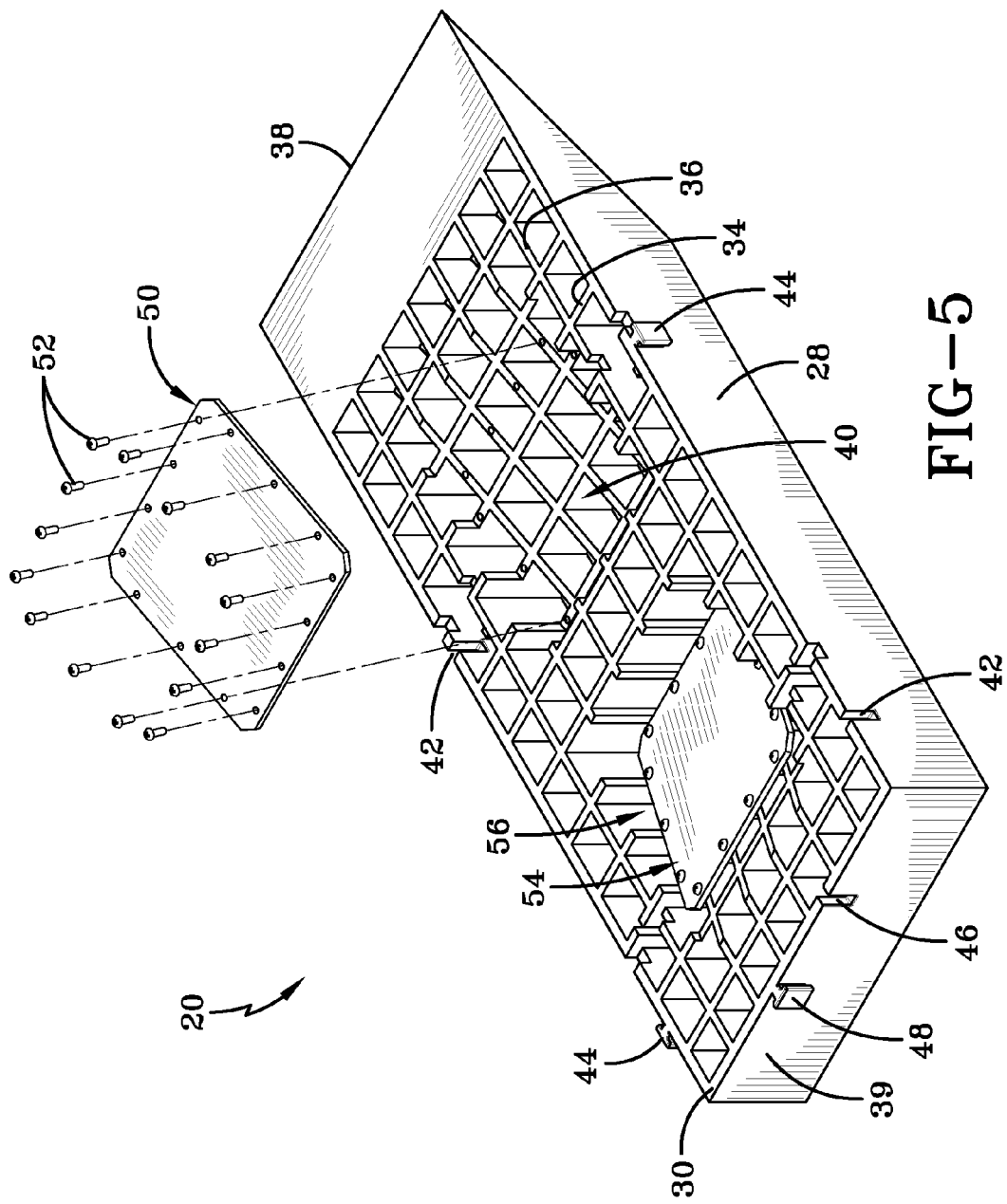
FIG. 5 is a bottom view of the stand showing one antenna installed and one antenna exploded from respective stand pockets.

With reference to FIGS. 3, 4 and 5, a stand component or section 20 is shown. As will be appreciated by the following, the drive over stand of the subject disclosure may constitute a single unitary body such as that shown in FIG. 3, or a modular array of interconnected bodies or sections, depending on the preference of the user and/or the size and configuration of the drive over stand for its intended application. Thus, the following description of the component or section 20 in FIGS. 3, 4 and 5 has application in both the single, unitary stand embodiment and the modular, multi-section embodiment of the invention.

The stand component 20 is formed from a suitably strong, RF signal transparent material, such as plastic. The stand 20 has a forward inclined ramp surface 22 that extends from a forward, ground-level edge 38 to a flat adjacent surface 26. The shape of the stand component 20 is generally rectangular in plan, but may be formed in other geometric configurations such as a square. The stand component or section 20 includes sidewalls 28 extending from a bottom support surface 30 to the planar, flat top surface 26. Formed within the underside of the component 20 is a matrix or grid 32 of intersecting lateral and longitudinal ribs or flanges 34, 36. The reinforcement grid 32 extends from the forward edge 38 of the component 20 to a rearward wall 39 of the strand component 20 and serves to provide supporting strength to the stand with which to support a vehicle traversing the stand upper surface. The grid formed by ribs or flanges 34, 36 is preferably integrally created by a conventional molding process used in the creation of the stand component 20.

Also formed is a pocket, receptacle, or chamber 40 within the reinforcement grid 32 during the molding of the stand component 20. The pocket 40 is sized and shaped to accommodate seating receipt of a read antenna assembly as will be explained. The pocket 40, as shown in FIG. 4, is positioned below the flat surface 26 of the stand, centered between stand sides 28. The pocket 40 is configured in section having an angled or sloped internal floor surface by which the read antenna assembly positioned in the pocket is tilted at a preferred directed angle.

The stand component 20 is further provided with an interlock feature that enables multiple stand components 20 to be interconnected in an array. A key slot 42 and protrusion 44 is formed in each side 28 of the stand in spaced apart relation as a similarly paired key slot 46 and key protrusion 48 is formed in the rear wall 39. The stand accepts within pocket 40 an antenna assembly 50 as shown in FIG. 50 with associate screw hardware 52 used to affix the antenna assembly 50 within the pocket 40. The antenna assembly 50 is in a panel configuration, incorporating read antenna within a substrate panel. As assembled, the antenna assembly 50 is generally rectangular and of complementary dimension and shape as the pocket 40 for close-fit insertion and seating.

Referring to FIG. 5, it will be appreciated that multiple pockets, each having an associated field-aimed read antenna assembly. Multiple antennae may be used to adjust the sensitivity and read-efficiency of the system in reading an RF signal from a vehicle passing over the stand. The stand operates as a speed control mechanism that slows the vehicle speed over the stand for optimal RFID read efficiency. In FIG. 5, an exemplary second antenna assembly panel 54 is received into a second pocket 56 formed within the stand 20. The second pocket 56 is located to the rear of the first pocket 46 and the second antenna assembly panel 54 is positioned and secured within the second pocket 56. The second panel and antenna 54 is tilted by the inward angled floor surface of the second pocket 56 so as to aim the second antenna 54 toward a preferred region of the upper surface 22 of the stand.

Figure 6:
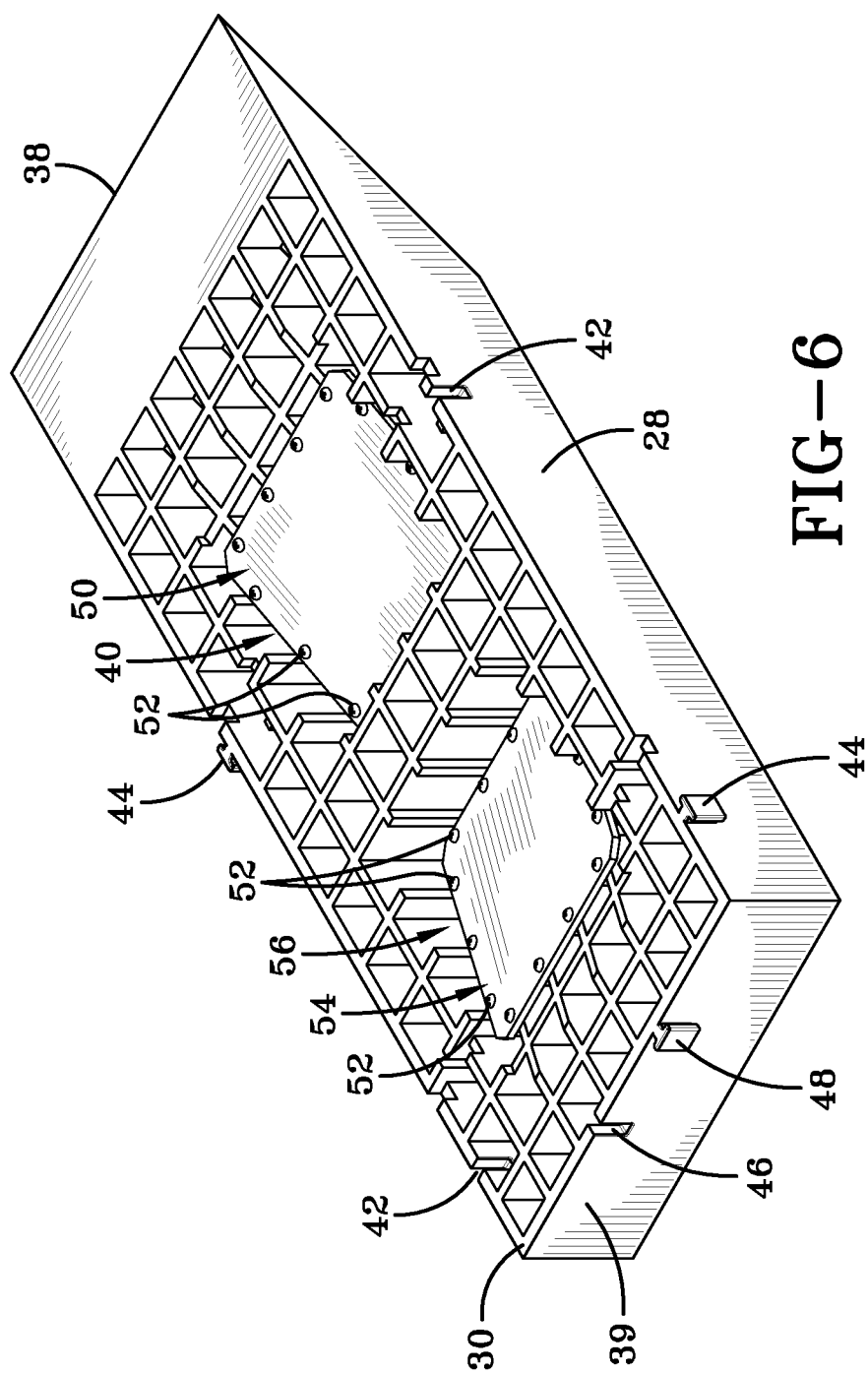
FIG. 6 is a bottom view of stand showing both antennas mounted.

FIG. 6 shows the completed assembly of the two antenna system into the underside of the stand 22. FIG. 7 shows in phantom the top plan view of the stand 22 with the two antenna panels 50, 54 in their relative positions respectively below the top surface of the stand. In FIG. 8, the respective tilt angles and direction of the antenna panels 50, 54 are shown with the rearward antenna 54 aimed toward the rear of the top surface 26 of the stand 22 and the forward antenna 50 aimed toward the forward end and ramped surface 24 of the stand. It will be appreciated that the read fields of the antenna assemblies 50, 54 consequently are directed and aimed at respective regions of the stand upper surface 24 so as to read a vehicle tire-based RFID tag passing across the stand upper surface at a reduced rate of speed imposed by the stand convex upper surface.

The degree of convexity of the upper stand surface, that is, the slope and elevation of the ramped on/off surfaces may be adjusted to slow the vehicle down to an optimal RFID-read rate of speed. Together with a proper location of the pockets, the tilt angle of the read antennae within the pockets, and an appropriate angled directional aiming of the read fields provided by the antenna or antennae, a reliable and predictable reading of the tire-based RFID tag may be achieved. The reading of the tire-based RFID tag will preferably be initiated and continue as the vehicle approaches, passes over and exits the stand 20. It will further be appreciated that, while only a forward ramped surface 24 is shown in the stand section 20, an exit ramp would be present in an actual stand suitable for field use. The antennae 50, 54, due to appropriate tilting by the pocket configuration in which each is seated, may be directed in a forward or rearward direction so as to read the tag on a tire as the tire approaches the stand along an approach path; engages and travels over the stand upper surface 22, and as the tire exits off the stand along an exit path.

Figure 9:
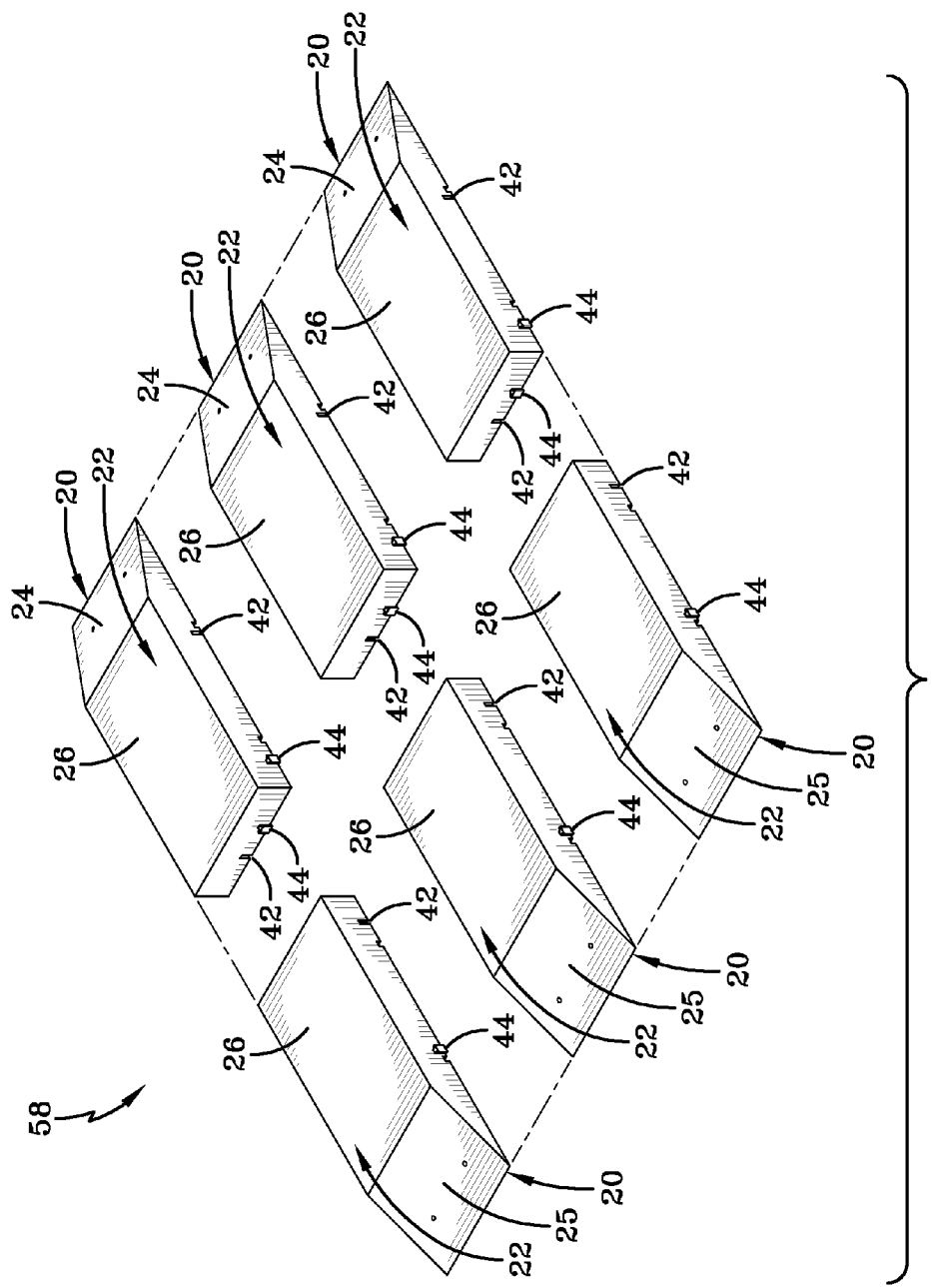
FIG. 9 is a perspective view showing multiple stand components positioned in an array before assembly.
Figure 10:
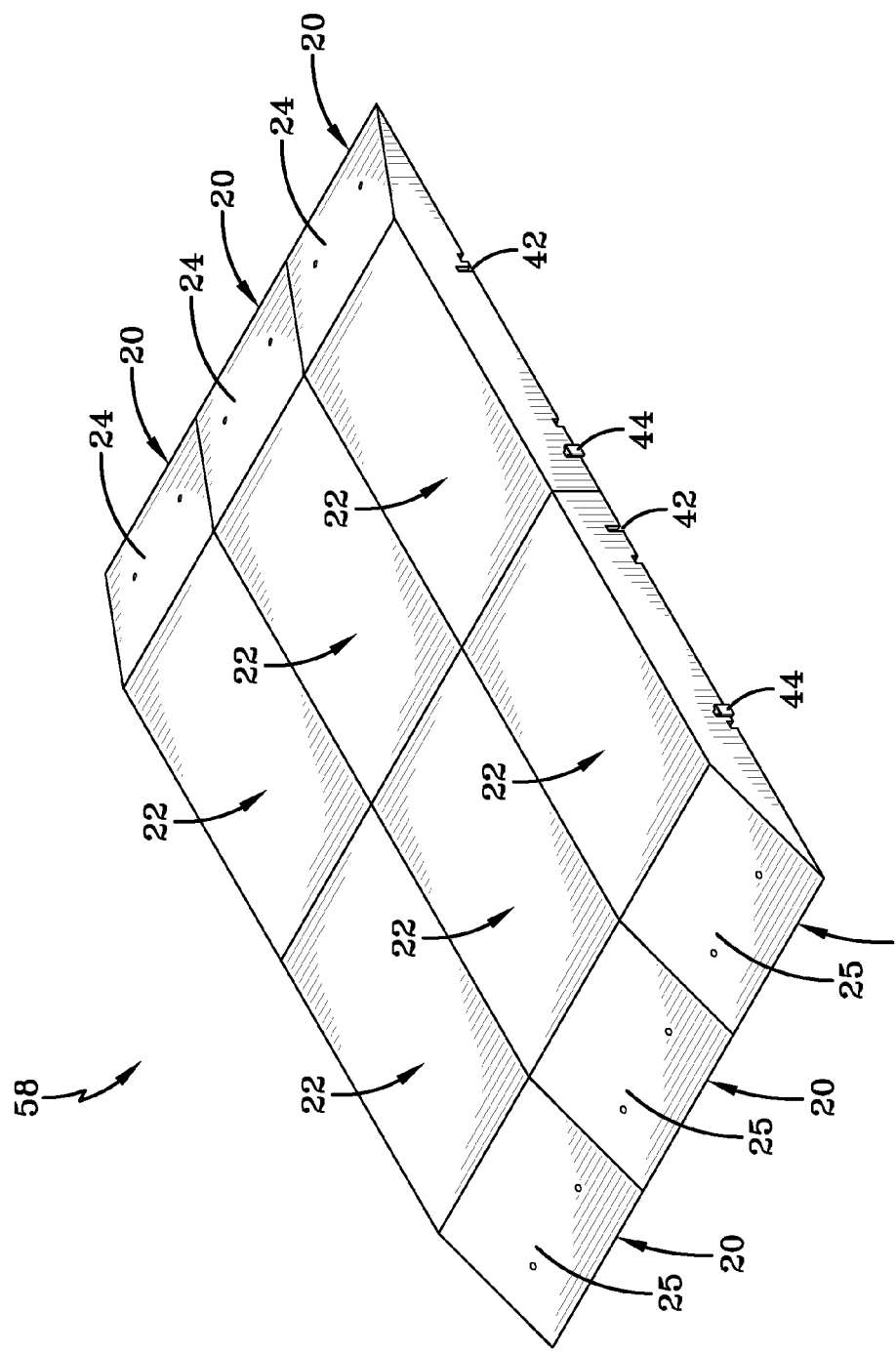
FIG. 10 is a perspective view of assembled stand components for dual tire reading.

Depending on the application, a larger stand may be required to effect an RFID reading of tire-based tags. As shown in FIGS. 9 and 10, an array of stand components or sections 20 may be constructed into a larger stand configuration by interlocking protrusions 44 and slots 42 in sides and ends of the stand sections into complementary protrusions and slots of adjacent stand sections. The stand sections 20 are configured to provide a ramped on-surface 24 and a ramped off surface 25 with the flat surfaces 26 of each section forming an intermediate flat surface between the ramped surfaces. As assembled, shown by FIG. 10, the array stand configuration 58 formed from multiple stand sections 20 forms a suitably wide and long upper surface 26. The pocket(s) within the underside of the array of stand sections 20, each contain a field-directed read-antenna as explained previously. An array of read-antennae accordingly is created beneath the drive-over surface 22.

Figure 11:
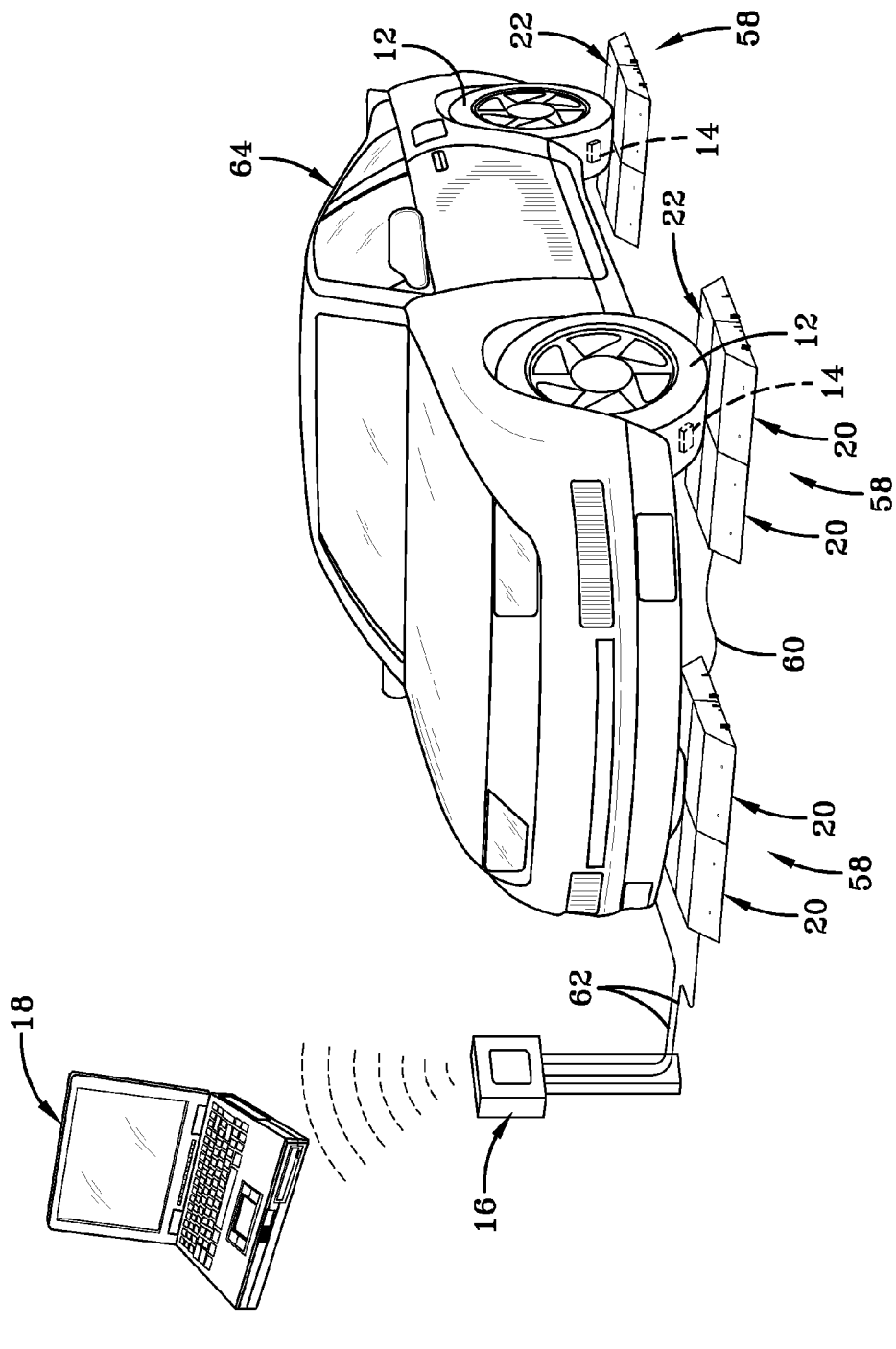
FIG. 11 is a perspective view showing (4) stand assemblies assembled and positioned for use.

FIG. 11 shows an array configured stand 58 formed from two sections 20. Four of the stands 58 are placed apart within in read station on the ground surface at a spacing designed to intercept the tires of a vehicle 64. Alternatively, a single stand large enough to accommodate all of the wheels of a vehicle may be constructed and used, the stand having read fields created by pocket-residing multiple antenna mountings within the single stand. The stands 58 are suitably wide and long to intercept the passenger tires as the vehicle 64 passes through the read station. The convex upper drive-over surface 22 of each stand operates to slow the vehicle speed to an optimal RFID tag read-speed. The length of the stands 58 is such that a complete revolution of each tire will occur as the vehicle passes over the stands, further ensuring a positive reading of the RFID tag of each tire. The stand antennae are wired by conductors 60, 62 to an RFID signal reader 16 which uploads RFID data to a computer 18, preferably by wireless transmission.

Figure 12:
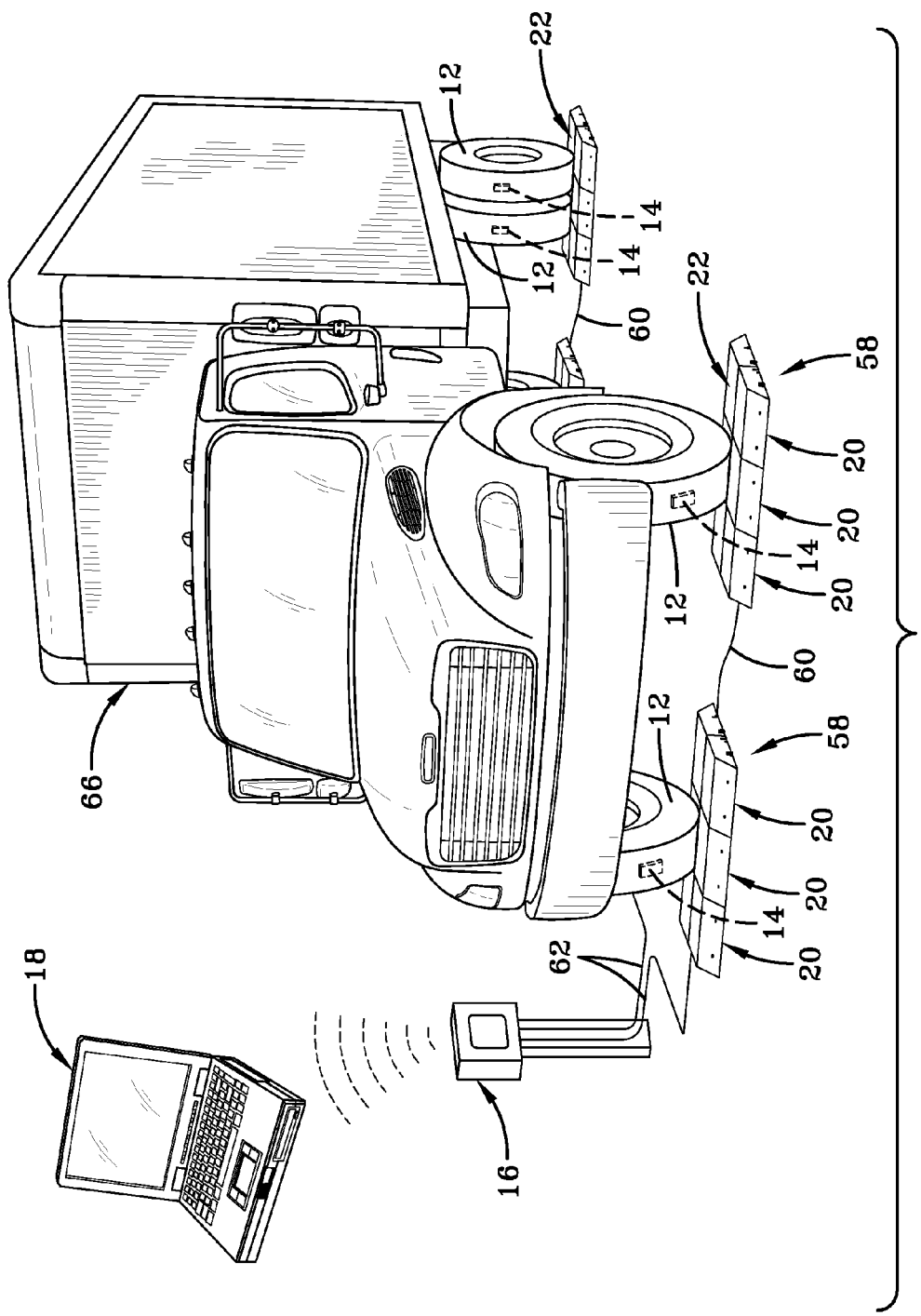
FIG. 12 is a perspective view showing (6) stands in use for a commercial truck.
Figure 13:
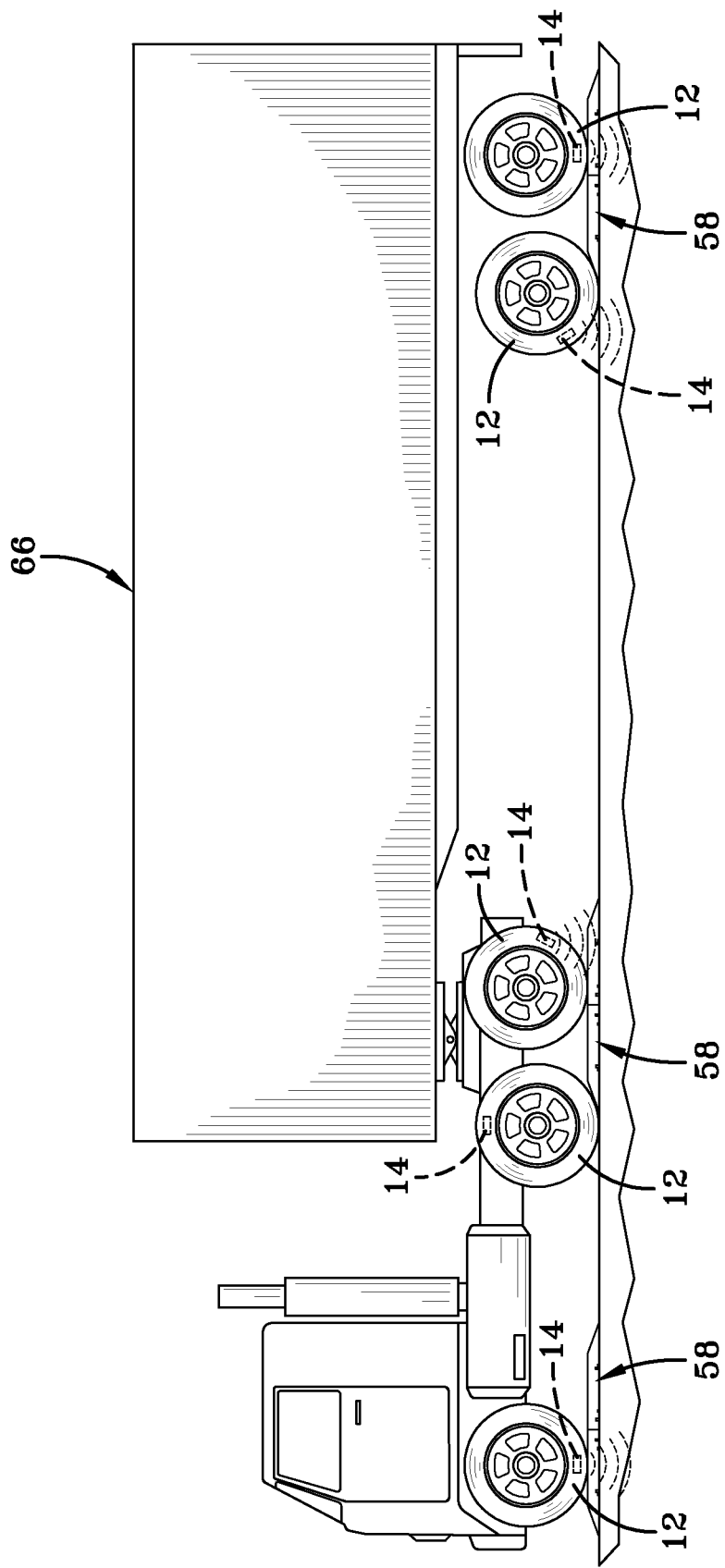
FIG. 13 is a side view of tractor and trailer using multiple stands in a reader system.
Figure 14:
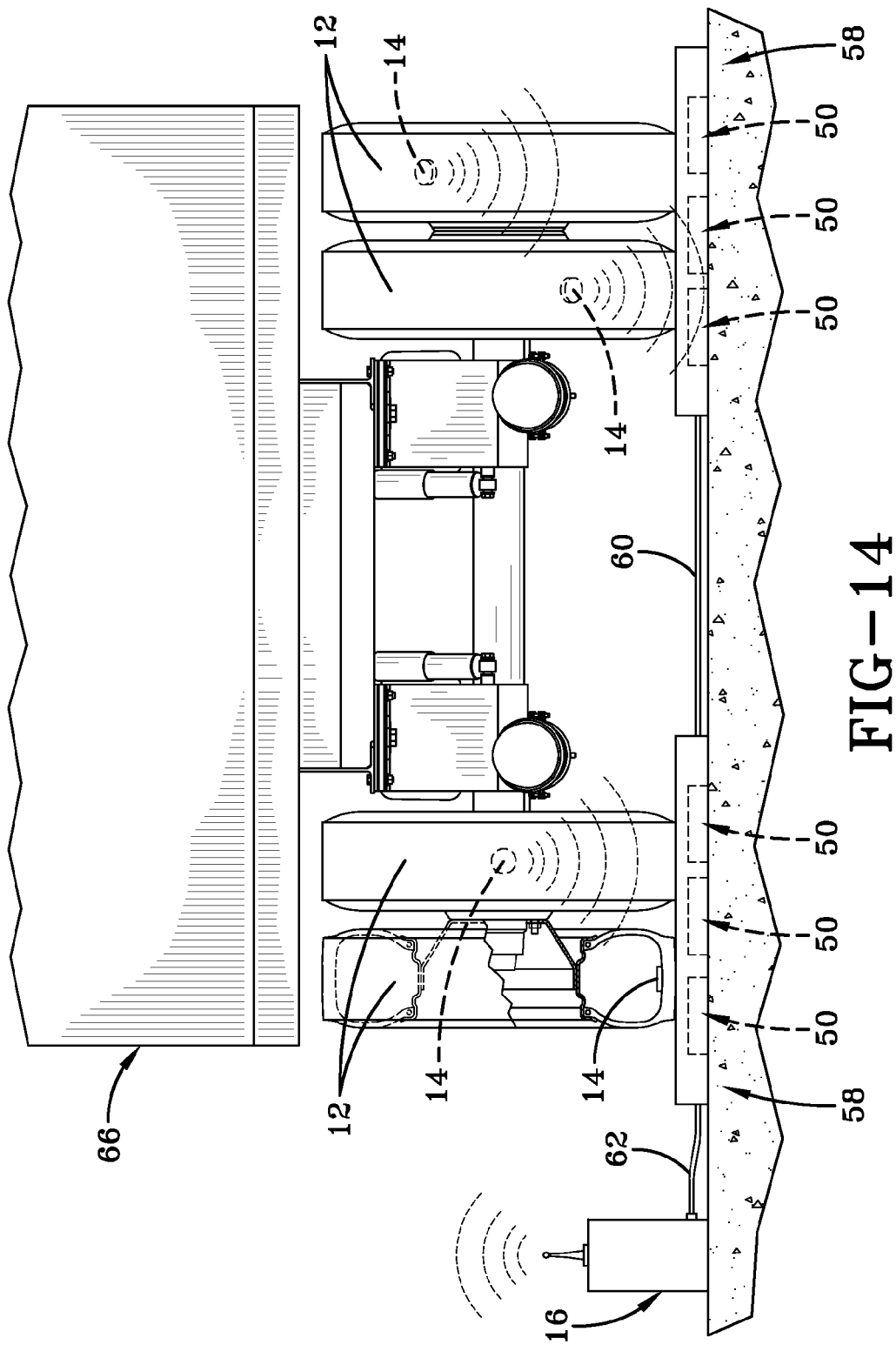
FIG. 14 is an end view of FIG. 13 showing stand locations.

Should a read station be intended for vehicle, particularly multi-wheel axle vehicles such as a truck 66, a larger stand array may be constructed as shown in FIGS. 12 and 13. For the truck read station, a three section stand is created by connecting three stand components 20 together as shown. The lengthwise size of each component 20 may be adjusted to create a stand 58 of sufficient length so as to ensure a complete revolution of the larger truck tire 12 over the stand surface 22. A positive and accurate reading of the RFID tag 14 mounted to each tire results. In addition, for tandem mounted tires, the wider stand provides antennae beneath each of the tandem tires as the tires pass over a stand. A simultaneous reading of both tires may be effected by appropriate aiming of the field generated by antennae within the pockets(s) of each stand component. FIG. 14 illustrates the directional aiming of read-fields from the antennae 50 within stand component pockets toward each of the tandem tires 12.

Figure 15A:
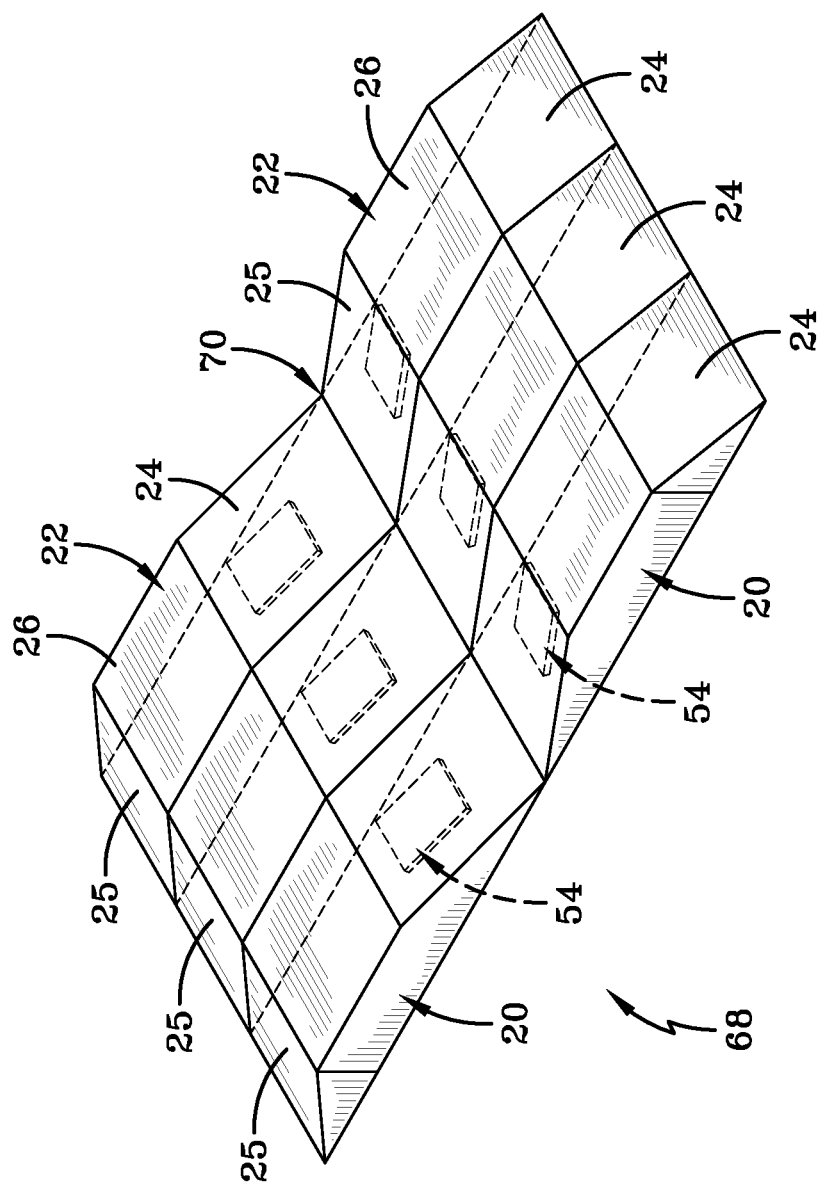
FIG. 15A is a perspective view showing an inverted ramp alternative embodied stand assembled.

FIGS. 15A through 15C show an alternative embodiment of a drive-over stand 68 in an array configuration pursuant to the invention. The stand 68 is constructed by a set of components 20 assembled together end to end to define a V-channel 70. The trailing or exit ramped surfaces 25 of the forward stand components combine with the lead-on or entry ramped surfaces 24 of the rearward stand components to define the V-channel 70 therebetween. The antennae 50, 54 mounted within underside pockets within the stand components are tilted and aimed directionally toward the ramped surfaces 25, 24 defining V-channel 70. As will be appreciated, a vehicle traversing over the upper surface 22 of the stand array 68 will slow down in speed as the tires encounter the lead-on ramped surfaces 24A of the first line of stand components 20, then travel across the flat surface 26. The vehicle will then slow further as the tires enter into the V-channel 70 from the first line of ramped exit surfaces 25A. The vehicle will then slow still further as the vehicle encounters the second line of lead-on ramped surfaces 24B and finally exits from the second line of exit ramped surfaces 25B. Directional antenna read-fields are directed toward the tires of the vehicle as they encounter the ramped surfaces 24A, 25A, 24B and 25B, ensuring a positive reading of the RFID tags mounted to the tires. The progressive slowing of the vehicle as the vehicle traverses the "M" shaped profile of the stand 68, coupled with the directional tilting of antenna read-fields toward the four lines of ramped surfaces 24A, 25A, 24B, 25B comprising the "M" shaped profile, achieves a high level of coupling between the read fields and the RFID tags and thus creates a system achieving a high level of RFID tag read efficiency. It will be understood that additional lines of stand components or sections may be added by protrusion and slot connection to the array of FIG. 15A if desired. A sequence of V-shaped channels in the elongated stand may thus be created to further reduce the vehicle's speed over the stand and provide additional lines of antennae mounted within component pockets with which to effect a reading of the RFID tags. The modularity of the stand sections or components facilitates and offers flexibility in the stand configuration that can meet the needs of the application or user.

Figure 16A:
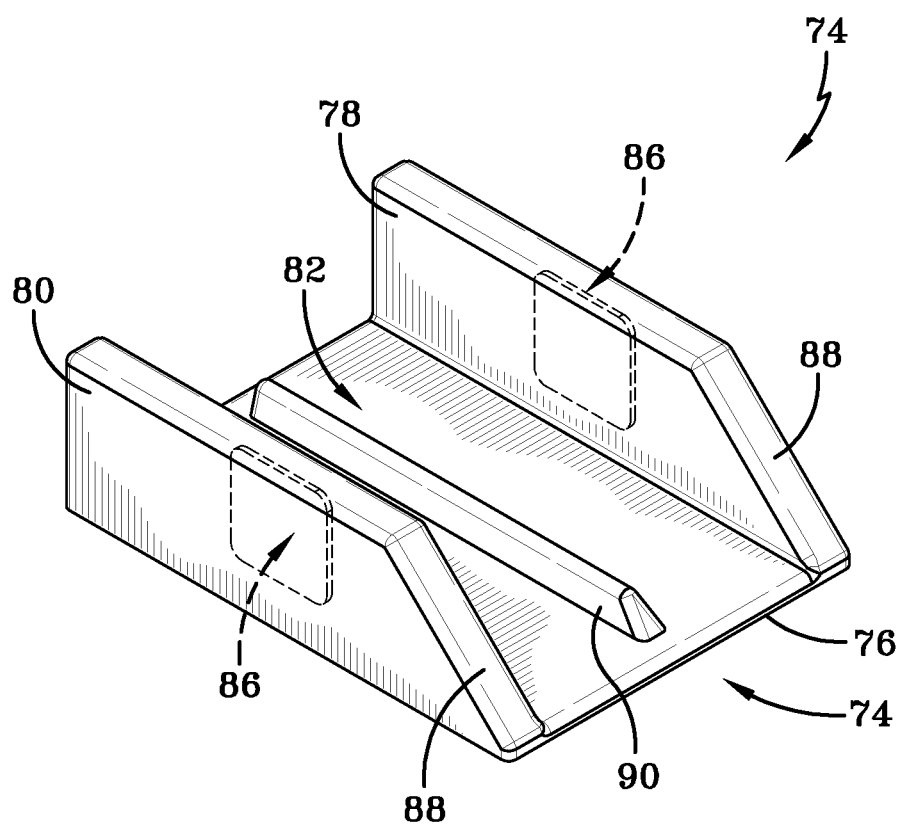
FIG. 16A is a perspective view showing a tire channel alternative embodiment stand.
Figures 16B, 16C:
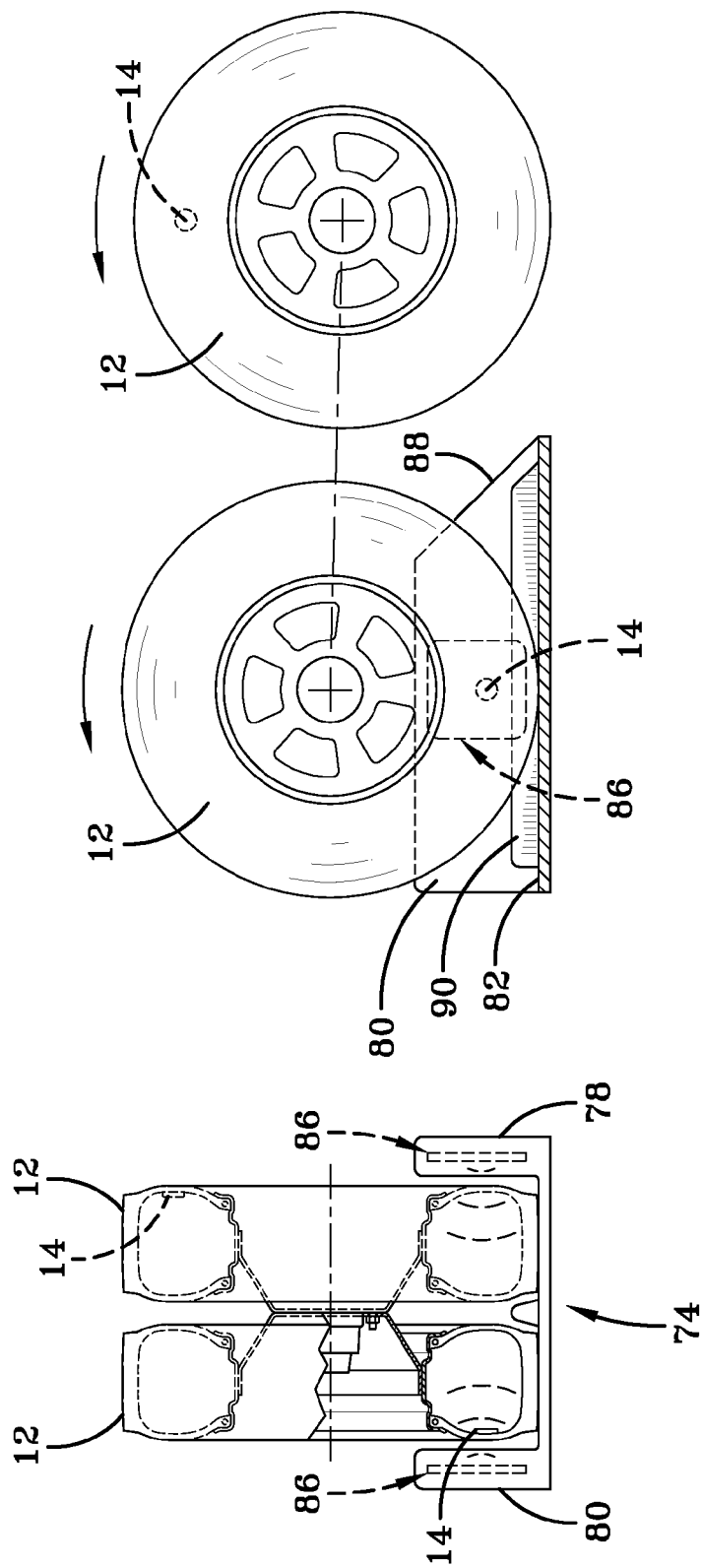
FIGS. 16B and C are end and side views showing the tire channel alternative embodiment in use.

Another alternative embodiment of a drive over stand 74 is shown in FIGS. 16A through FIG. 16C. The stand 74 is configured having a floor 76, parallel opposite side walls 78, 80, open ends and a through channel 82 between the side walls 78, 80. RFID tag reading antennae 84, 86 mount to the side walls 78, 80 and direct an aimed read-field into the channel 82. The forward edges 88 of the side walls 78, 80 and a dividing rib 90 extends longitudinally along the floor surface 76 of the stand, projecting upward into channel 82. As shown in FIGS. 16B and 16C, a vehicle tire 12 carrying an RFID tag 14 is driven through the channel 82 with the stand 74 positioned on a ground surface in alignment with the tire. The read fields generated from the read antennae 84, 86 and directed into the channel 82 function to read the RFID tire-based tags as the tire passes through the channel 82. By mounting the antenna 84, 86 into opposite respective side walls 78, 80, both tandem tires from a truck may be read simultaneously. The divider rib 90 operates to align the tires within the channel 82 as the tires are driven through the stand. The stand 74 effectively reads the RFID tags as the tire passes through. However, stand 74 lacks the speed reduction capability afforded by the convex stand embodiments previously described.

Figure 17A:
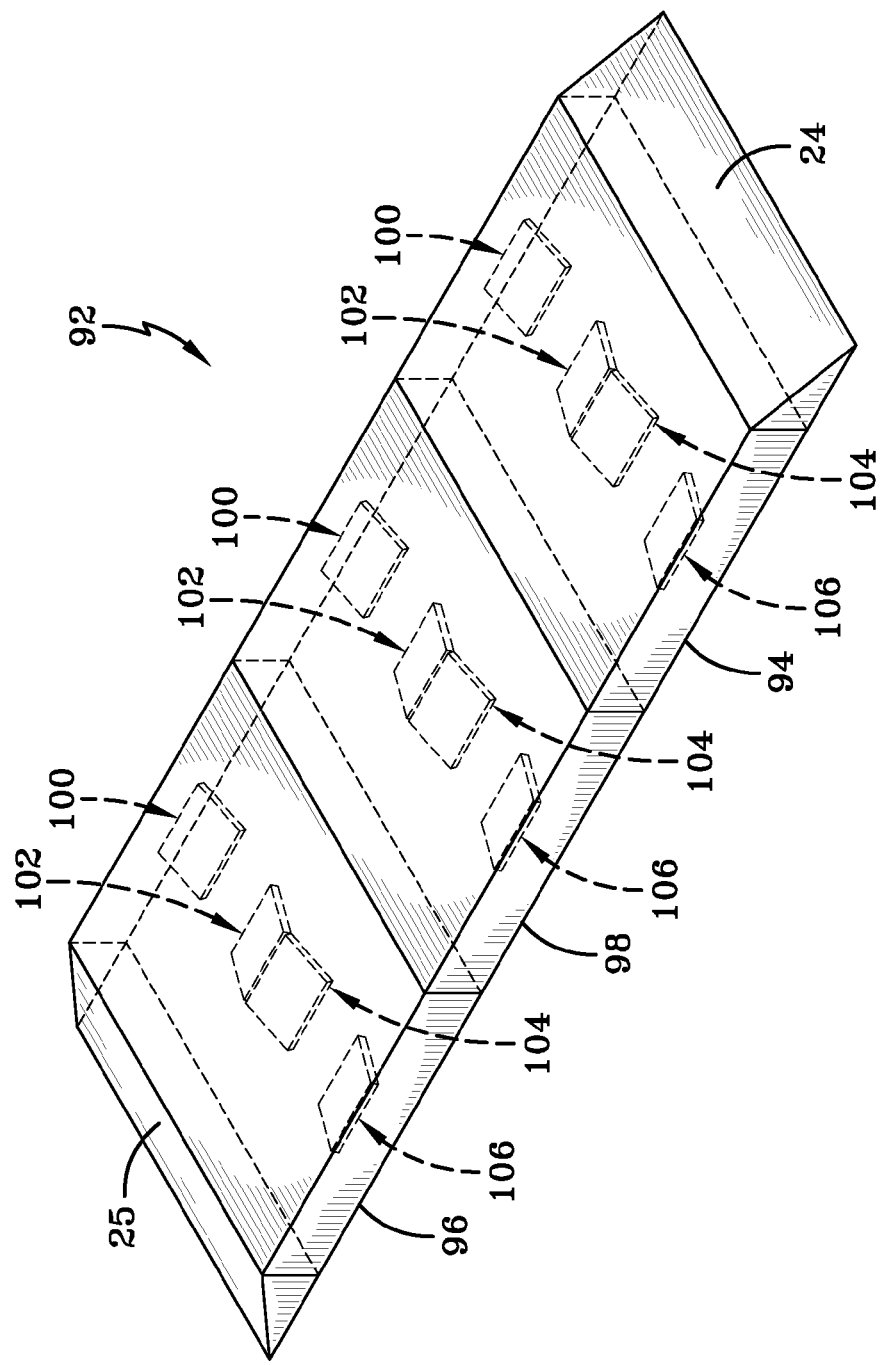
FIG. 17A is a perspective view showing a "W" shaped antenna alternative configuration.
Figure 17C:
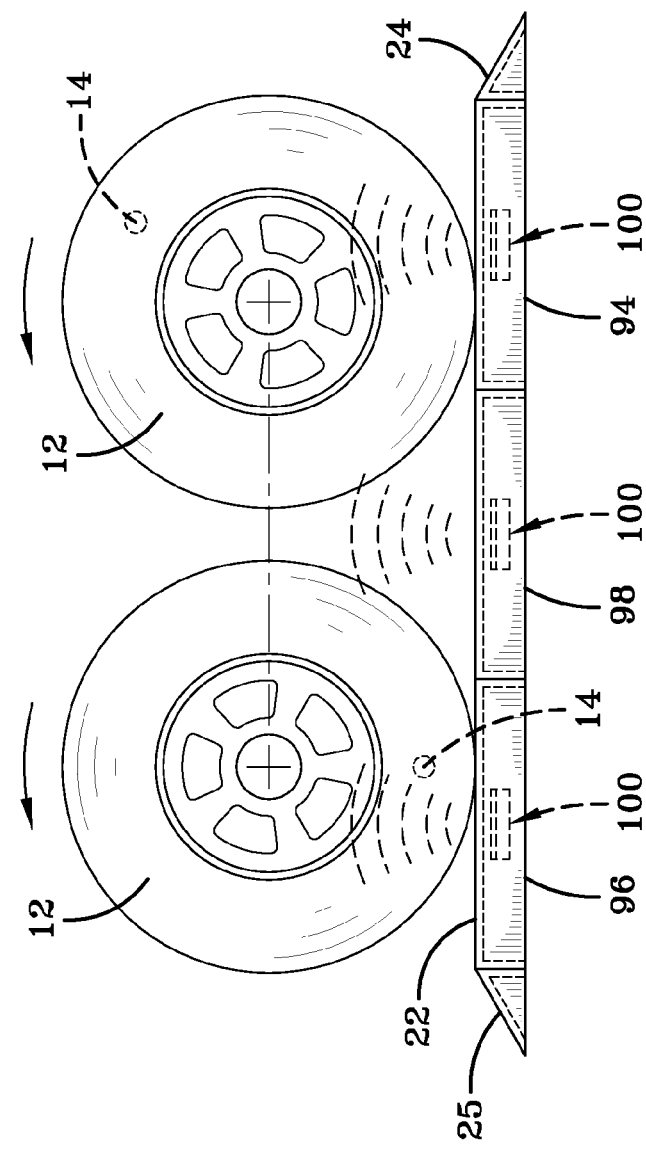
FIGS. 17B and C are end and side views showing "W" shaped antenna alternative embodiment in use.
Figure 17B:
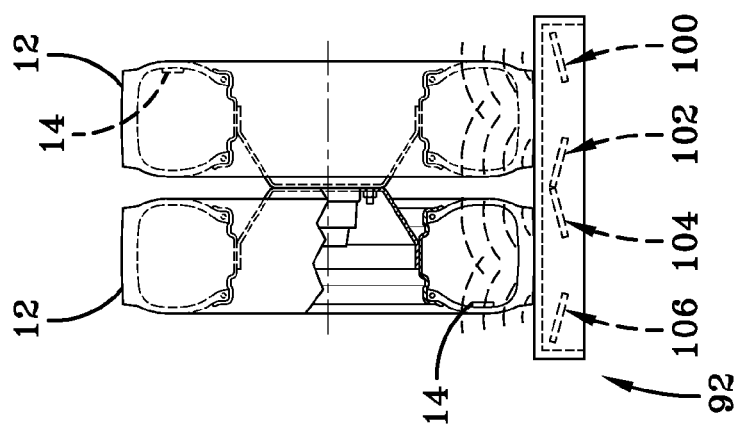

With reference to FIGS. 17A-17C, an alternative embodiment is shown in which a pocket-based antennae 100, 102, 104, 106 are mounded at a tilt angle in multiple stand components 94, 96, 98 connected in series. The antennae are arranged in an alternative, transverse linear pattern across a respective stand component. Each antennae 100, 102, 104, 106 is tilted within a respective underside pocket at a preferred tilt angle that aims the read field of each antenna in a preferred direction. Each antenna is thus positioned to direct its read field toward the tire RFID tag passing over the stand surface. Antenna 102, 104 angle inward toward each other and face toward opposite sides of the stand component. Accordingly, the antennae array within each component assumes generally a "W" shape in transverse profile. FIGS. 17B and 17C illustrate a tandem truck tire pairing passing over the stand with the transverse linear array of antennae 100, 102, 104, 106 in a read mode. It will be understood that the end stand sections 94, 96 are ramped and connect to a non-ramped intermediate stand section 98. More sections may be incorporated to elongate the stand, if desired, to subject the tire RFID tags to more read fields as the tire traverses over the stand.

Figure 18A:
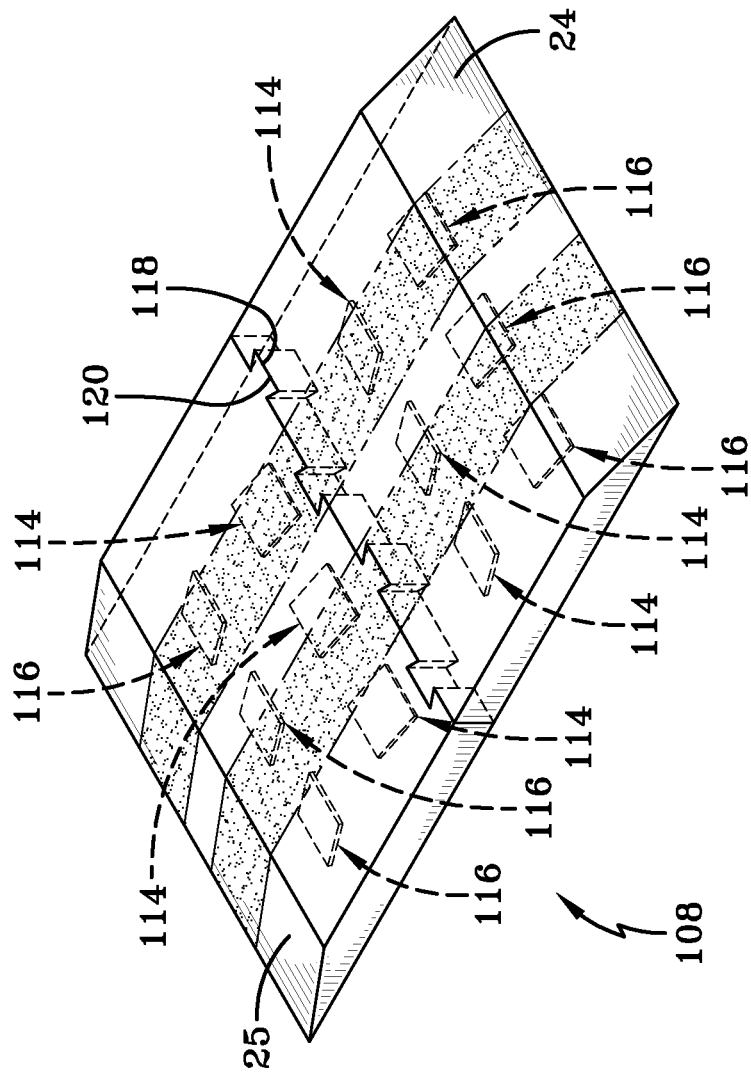
FIG. 18A is a perspective view showing interlocking stand component alternative embodiment as assembled.
Figure 18C:
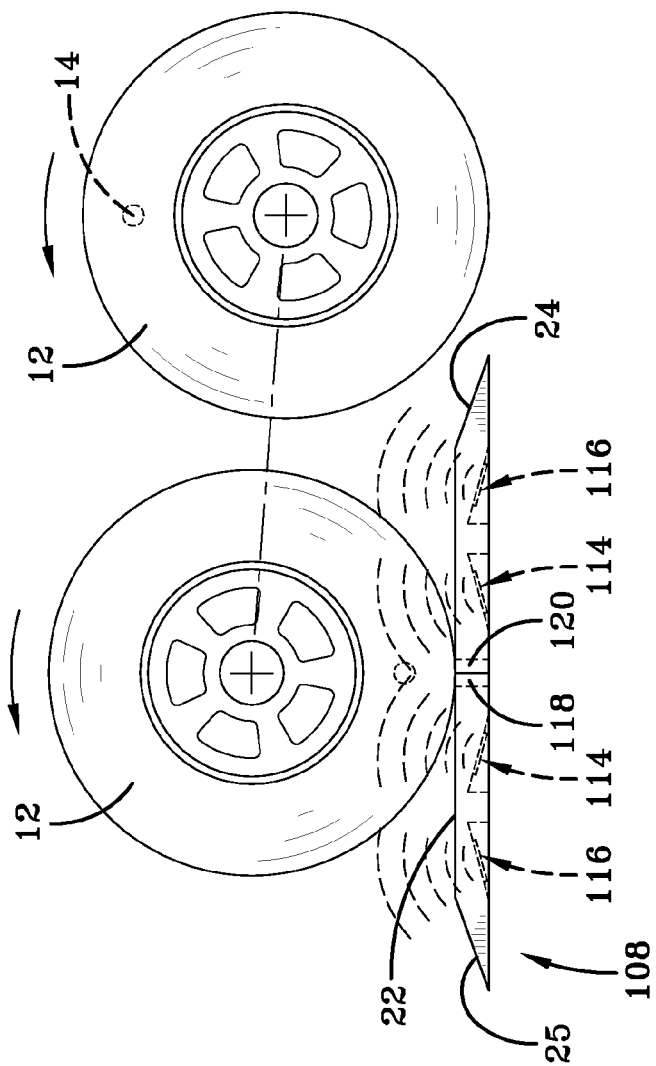
FIGS. 18B and C are end and side views showing interlocking stand component alternative embodiment in use.
Figure 18B:
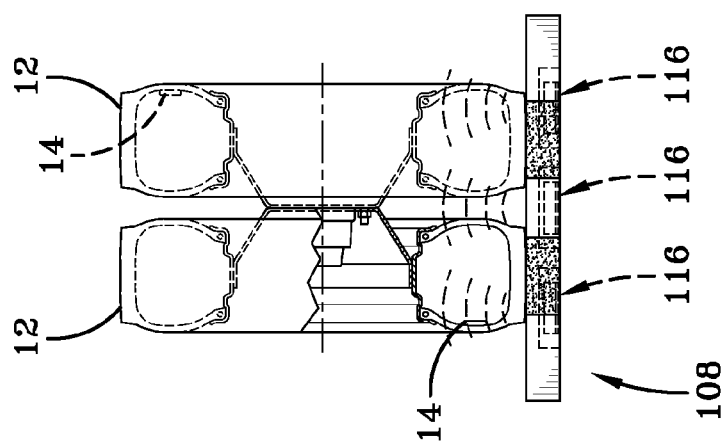

In FIGS. 18A through 18C, an alternative stand configuration 108 is shown employing alternative interconnection means for connecting stand sections 110, 112 together. The stand sections 110, 112 are provided with antenna 114 mounted within section pockets as described previously. The antennae 114 are shown in the transverse linear configuration across each stand component 110, 112 but may be configured in a front to back orientation as described previously. The stand sections 110, 112 employ a dovetail joint to interconnect together. Dovetail projections 116 along a rearward side of each section fit into dovetail slots 118 of the opposite stand component to detachably interconnect the two components 110, 1112 together. Ramps 24, 25 of the connected components form the forward lead-on and exit off ramps for vehicles driving over the stand 108.

From the foregoing, it will be appreciated that the drive-over stand of the subject invention provides internal pockets formed within the stand and below a drive over surface 22. The pockets are placed in strategic locations and receive antenna devices, preferably in form of an antenna panel therein. The pockets orient and aim the seated antenna panels to preferred drive over surface regions, by tilting or angling the antenna panels at respective tilt angles. For the forward and rearward tilted antenna panels, the tilt angle between the plane of the antenna panel to a bottom surface of the stand is preferably within a range of 13 to 15 degrees The tilt of an antenna panel forward, toward a forward stand ramped entry surface, and an antenna panel rearward toward a rearward ramped exit surface, allows the directed read fields from the antenna panels to interrogate and read the tire-based RFID tags as the tire approaches the stand along an approach path, and to interrogate and continue to read the tire-based RFID tags after the tire exits from the stand along an exit path. Additional pocket-seated antenna panels may be mounted to interrogate and read the tags across an intermediate surface between the forward and rearward ramped surfaces.

It will further be appreciated that, in the stand configurations disclosed in which the stand in convex as it rests upon the ground surface, the drive over stand fulfills a secondary function of slowing the vehicle down as it passes over the stand to an optimal rate of speed for interrogating and reading the tire-based RFID tags. The stands further provide by means in the pocket configuration for tilting or aiming the antenna panels in a direction that optimizes the read range and effectiveness of the stand. The antenna panels are each aimed individually and seated within a pocket. So situated, the multiple antenna panels cooperate to ensure that the collective fields generated from each adequately cover the approach path of the vehicle tire, the traverse path of the tire over the stand, and the exit path of the tire from the stand. Accordingly, the stand and antenna panel assembly ensure that one or more read fields will effectively read the RFID tags mounted to the vehicle tires. The drive-over stand assembly, in fulfilling the dual functions of vehicle speed reducer and read field distributor, ensures the drive over reader assembly accomplishes a reliable reading of the tire-based RFID tags.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A stand and antenna assembly for receiving a data transmission from an electronic transmitting device mounted to a vehicle, the vehicle having at least one tire assembly including a tire, the stand and antenna assembly comprising:
    a stand having a substantially convex upper surface, the upper surface comprising a lead-on ramped surface and an exit-off ramped surface aligned and operative to intercept and engage the vehicle tire as the vehicle tire traverses along a tire travel path between the lead-on ramped surface and the exit-off ramped surface over the upper surface of the stand, whereby slowing the rotational rate of the vehicle tire to a targeted reduced rotational read rate as the tire passes over the stand;
    the stand further comprising a base having a first pocket disposed therein within a stand underside;
    an approach antenna assembly within the first pocket of the base, the approach antenna assembly seated at an approach tilt angle within the first pocket operative to direct an approach read field toward a vehicle approach path to the stand;
    the base further having a second pocket disposed within the stand underside;
    an exit antenna assembly within the second pocket of the base, the exit antenna assembly seated at an exit tilt angle within the second pocket operative to direct an exit read field toward a vehicle exit path from the stand;
    the base further having a third pocket disposed within the stand underside between the first and the second pockets;
    a middle antenna assembly seated within the third pocket and directing a middle read field toward an intermediary region of the upper surface disposed between the lead-on ramped surface and the exit-off ramped surface of the stand upper surface; and
    wherein the approach read field, the exit read field and the middle read field are aligned along the tire travel path operable to sequentially read the data transmission from the vehicle electronic device.

2. The stand and antenna assembly of claim 1, wherein the intermediary region comprises a V-shaped channel extending transversely across the stand, the V-shaped channel defined by converging ramped surfaces; the middle antenna assembly directing a read field toward the converging ramped surfaces of the V-shaped channel.

3. The stand and antenna assembly of claim 1, wherein the approach antenna assembly, the exit antenna assembly, and the middle antenna assembly are directed at respective angles toward mutually differentiated regions of the stand upper surface.

4. The stand and antenna assembly of claim 3, wherein the approach antenna assembly and exit antenna assembly are tilted at an acute angle between 13 to 15 degrees with respect to a bottom plane of the stand base.

5. The stand and antenna assembly of claim 1, wherein the first pocket is defined by an angled floor surface supporting the approach antenna assembly.

6. The stand and antenna assembly of claim 1, wherein the stand comprises a modular array of a plurality of stand components mutually connected together along stand component surfaces oriented substantially perpendicular to the tire travel path.

7. A stand and antenna assembly for receiving a data transmission from an electronic transmitting device mounted to a vehicle, the vehicle having at least one tire assembly including a tire, the stand and antenna assembly comprising:
    a stand having an upper surface comprising a forward lead-on ramped surface and a rearward exit-off ramped surface aligned and operative to intercept and engage the vehicle tire as the vehicle tire traverses over the upper surface of the stand, whereby slowing the rotational rate of the vehicle tire to a targeted reduced rotational read rate as the tire passes along a tire travel path over the stand;
    the stand further comprising a first pocket and a second pocket disposed within an underside of a base; an approach antenna assembly and an exit antenna assembly seated respectively within the first and the second pockets at a respective first and a respective second tilt angle; the approach antenna assembly aiming a directional first read field toward a vehicle approach path to the stand and the exit antenna assembly aiming a directional second read field toward a vehicle exit path from the stand; and
    wherein the base comprising a first base component supporting the lead-on ramped surface and housing the first pocket and a second base component supporting the exit-off ramped surface and housing the second pocket, and wherein the first base component and the second base component are interlocked along component surfaces oriented substantially perpendicular to the tire travel path.

8. The antenna and stand assembly of claim 7, wherein the approach antenna assembly and the exit antenna assembly each comprise a planar panel body, a plane of the planar panel body tilting at a prescribed tilt angle toward the vehicle approach path and the vehicle exit path, respectively.

9. The stand and antenna assembly of claim 8, wherein the stand comprises a third pocket disposed within the base between the first pocket and the second pocket; and a middle antenna assembly seated within the third pocket and aiming a directional middle read field toward an intermediary region of the upper surface disposed between the lead-on ramped surface and the exit-off ramped surface of the stand upper surface; and wherein the approach read field, the exit read field and the middle read field are aligned along the tire travel path operable to sequentially read the data transmission from the vehicle electronic device.

10. The stand and antenna assembly of claim 9, wherein the intermediary region comprises a V-shaped channel extending transversely across the stand, the V-shaped channel defined by converging ramped surfaces; wherein the middle antenna assembly directs a directional read field toward a selected converging ramped surface of the V-shaped channel.

11. The stand and antenna assembly of claim 10, wherein the approach antenna assembly, the exit antenna assembly, and the middle antenna assembly each comprise a planar panel body directed at respective angles toward the stand upper surface.

12. The stand and antenna assembly of claim 11, wherein the approach antenna assembly and the exit antenna assembly each are tilted at an acute angle between 13 to 15 degrees with respect to a bottom plane of the stand base.

13. The stand and antenna assembly of claim 12, wherein the first pocket and the second pocket each are defined by an angled floor surface supporting the approach antenna assembly and the exit antenna assembly, respectively.

14. The stand and antenna assembly of claim 7, wherein the stand comprises a modular array of a plurality of stand components, each component housing a respective pocket and antenna assembly, the array of stand components mutually connected together, wherein a width of the modular array having a width dimension at least as great as a circumference of a vehicle tire.

* * * * *